United States Patent [19]

Somm

[11] 4,273,303
[45] Jun. 16, 1981

[54] ADAPTIVE AIRPLANE LANDING GEAR

[75] Inventor: Paul T. Somm, Bellevue, Wash.

[73] Assignee: The Boeing Company, Seattle, Wash.

[21] Appl. No.: 21,365

[22] Filed: Mar. 16, 1979

[51] Int. Cl.$^3$ .............................................. B64C 25/58
[52] U.S. Cl. ............................ 244/104 FP; 267/64 R; 188/299; 188/289
[58] Field of Search ..................... 244/104 R, 104 FP; 267/64 R, 124, 8 A; 188/299, 322, 314, 315, 317, 289

[56] References Cited

U.S. PATENT DOCUMENTS

| | | | |
|---|---|---|---|
| 2,735,674 | 2/1956 | Smith et al. | 244/104 FP |
| 2,814,482 | 11/1957 | Anderson et al. | 244/104 FP |
| 3,458,016 | 7/1969 | Keech | 244/104 R |
| 3,598,207 | 8/1971 | Hartel | 188/289 |
| 3,696,894 | 10/1972 | Brady et al. | 188/289 |
| 3,724,832 | 4/1973 | Ceska | 267/64 R |
| 4,065,078 | 12/1977 | Jenkins | 244/104 FP |

FOREIGN PATENT DOCUMENTS 702079  1/1954  United Kingdom .............. 244/104 FP

*Primary Examiner*—Galen L. Barefoot
*Attorney, Agent, or Firm*—Morris A. Case; B. A. Donahue

[57] ABSTRACT

A duo mode gas hydraulic shock absorbing landing gear strut with a pneumatic spring in combination with a hydraulic fluid controlling orifice for touchdown and automatic means for changing mode after touchdown to impart new pneumatic spring characteristics and to provide duo paths for controlling hydraulic fluid flow.

9 Claims, 4 Drawing Figures

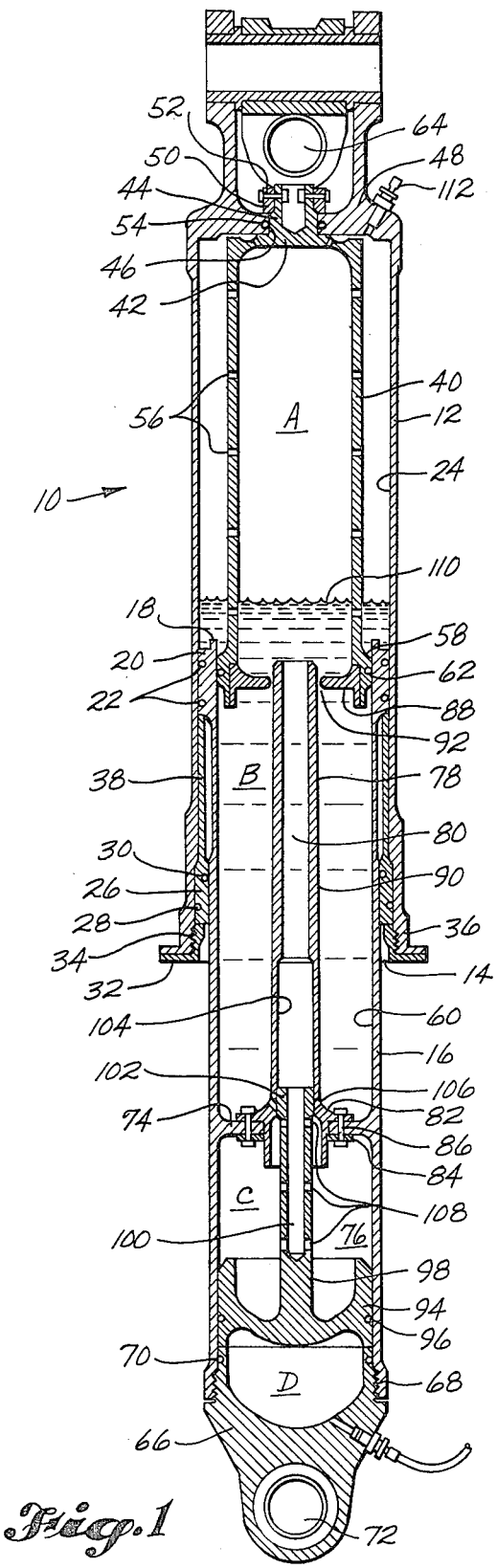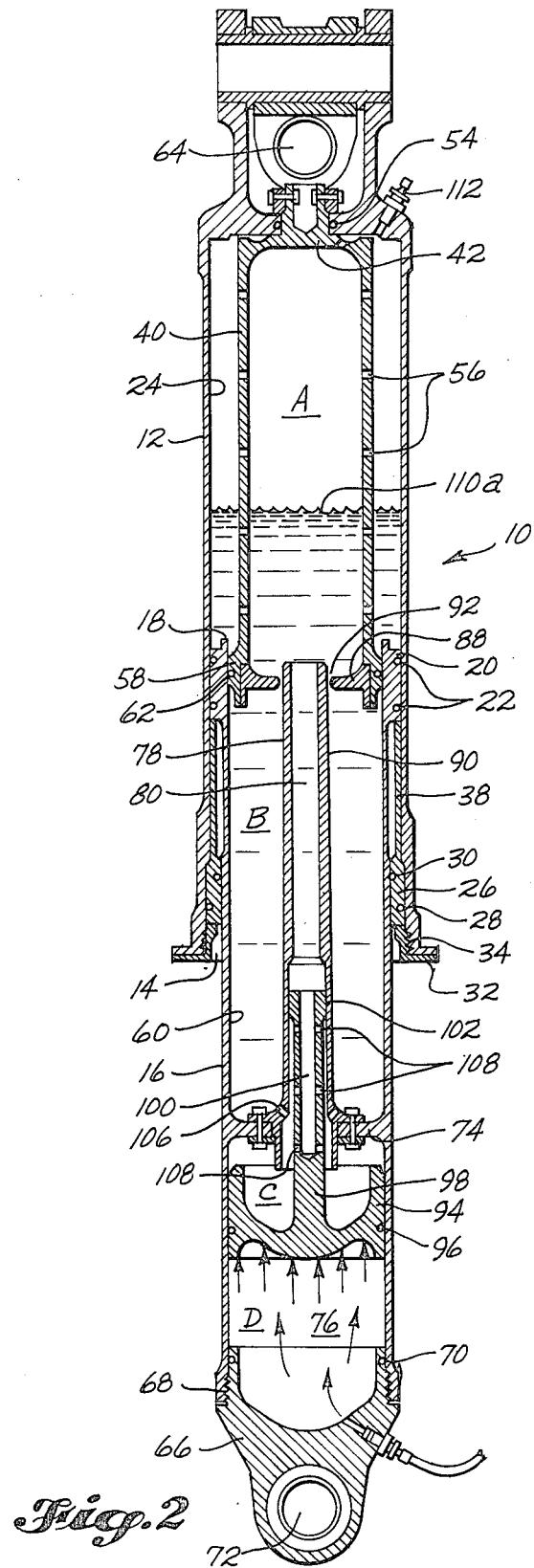

ADAPTIVE AIRPLANE LANDING GEAR

The invention described herein may be manufactured and used by or for the Government of the United States of America for governmental purposes without the payment of any royalties thereon or therefore.

BACKGROUND OF THE INVENTION

Airplane landing gear are subjected to very high shock loads. To handle these loads it has become the accepted practice to use telescoping cylinders having both a pneumatic spring in the form of a gas to act in combination with and directly upon a hydraulic fluid having controlled flow as the cylinders interact. This serves to both absorb the loads and to dampen excessive rebounding which may bounce the airplane off the ground. A shock absorbing landing gear requires a stiff air spring with large hydraulic damping characteristics to handle the loads during touchdown, and it is desirable to have a soft air spring with small hydraulic damping characteristics after touchdown and during roll and/or while taxiing on the ground to give a more comfortable ride to passengers and or to improve the fatigue life of the airplane.

In U.S. Pat. No. 2,451,171 a second and collapsible air compartment is located in the hydraulic fluid. That secondary air is at higher pressure than the first or primary air and the second compartment collapses to act as a second pneumatic spring under heavy loads. Dampening of rebound is accomplished with flap valves. U.S. Pat. No. 3,888,436 uses high pressure secondary air to contain a piston, and under heavy loads the piston moves to provide a secondary pneumatic spring action. U.S. Pat. No. 2,735,674 uses high pressure secondary air to contain a piston which moves to provide a secondary pneumatic spring and in addition the piston contains a plunger to control openings and provide for fluid flow as the original fluid dampening flow is closed off under heavy loads.

SUMMARY OF THE INVENTION

A shock absorbing airplane landing gear strut of a pair of cylinders sealingly and reciprocally joined together are urged apart with primary pneumatic pressure acting on a hydraulic fluid. Spring action from the pneumatics, and a single orifice for the hydraulic fluid control relative movement and absorb the shock between the two cylinders during touchdown of the airplane. Once the airplane is down and the landing gears are fully loaded that load initiates a logic system to activate a control valve and introduce pneumatic fluid into the cylinders to drive a piston toward the primary pneumatics uncovering a second flow path to provide dual control of the flow of the dampening hydraulic fluid due to relative movement of the cylinders during movement on the ground after landing.

It is an object of this invention to provide a dual mode airplane landing gear strut.

It is another object of this invention to provide a landing gear with stiff landing gear characteristics for landing, and with soft landing gear characteristics for airplane movement on the ground.

DESCRIPTION OF THE DRAWINGS

FIG. 1 shows a side elevational sectional view of the shock absorber strut of this invention with the strut in the touchdown mode.

FIG. 2 shows a side elevational sectional view of the strut of FIG. 1 with the strut in the ground movement mode.

DETAILED DESCRIPTION

Figure 4:
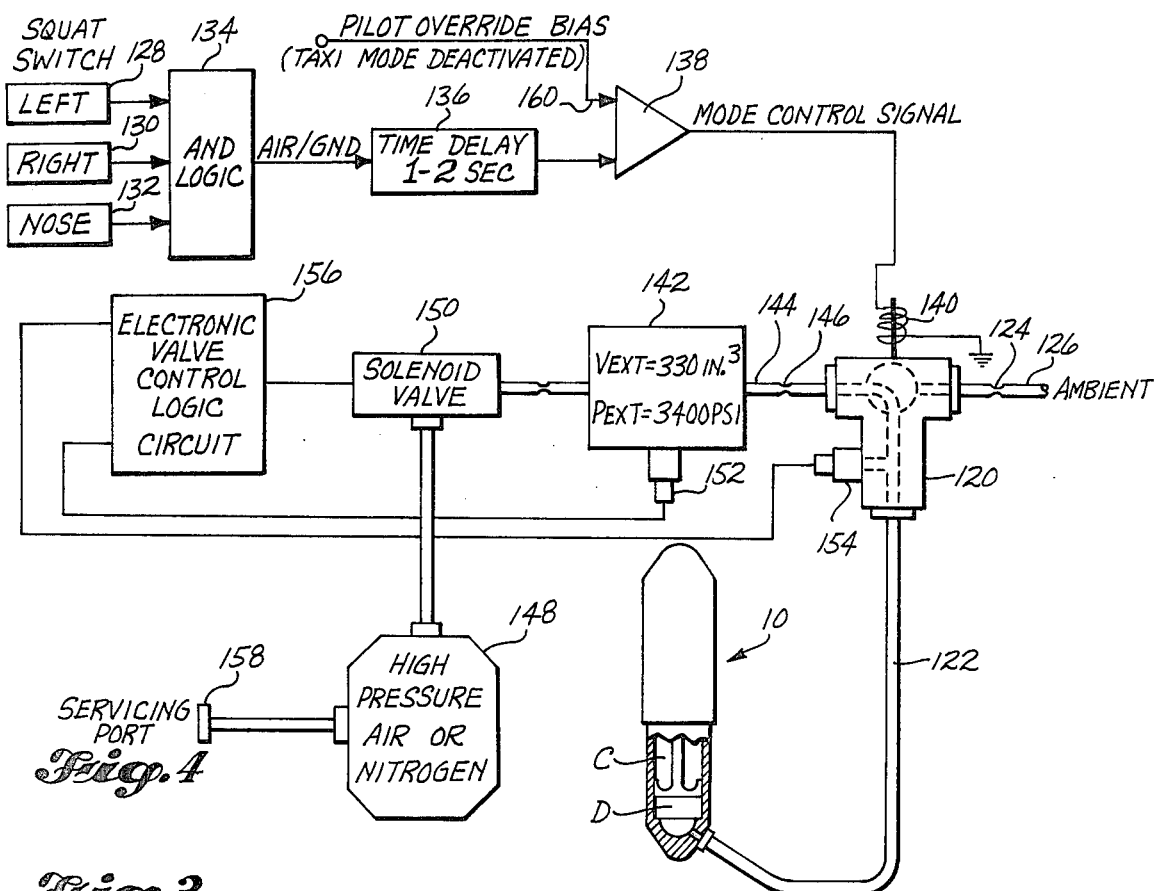
FIG. 4 shows a block diagram of sequencing logic for effecting dual mode operation of this strut.

Shock absorbing landing gear strut 10 has an outer cylinder 12 open ended at 14 and an inner cylinder 16 open ended at 18. These open ends face each other and the inner cylinder is slideably and sealingly telescoped within the outer cylinder. A slide ring 20 which is an enlarged portion of the end of the inner cylinder has O-ring seals 22 and the ring slidingly moves along the inside 24 surface of the outer cylinder. Spacer ring 26 has an outer O-ring seal 28 and inner O-ring seal 30 to effect a fluid tight seal between the two cylinders. Clamp 32 is threadably joined at 34 to flange 36 of the outer cylinder which serves to hold spacer ring 26 in place, and integral to the spacer ring is a travel limiting control ring 38, which limits the outward travel of the inner cylinder by abutting against the slide ring 20. A tube 40 closed at end 42 has a projection 44 that is used to extend through an opening 46 in outer cylinder head 48 and is fastened to the head with brackets 50 and fasteners 52. O-ring 54 seals off these two units. The tube is perforated at 56 along its length and has a flange 58 at the end. The flange is sized to slideably move within the inside wall 60 of the inner cylinder 16 and has an O-ring 62 for sealing off those two units. The head has opening 64 to provide means for fastening to an airplane structure, not shown. A head 66 threadably fastens at 68 to the inner cylinder, and O-ring 70 seals off those parts. An opening 72 through the head permits fastening to an airplane landing gear, not shown.

A bulkhead 74 in combination with the head 66 makes a separate compartment 76 in the inner cylinder. A metering pin 78, hollow at 80 throughout its length has an outwardly extending flange 82 used to join the pin to the bulkhead with clamp 84 and fasteners 86. The metering pin extends axially from the bulkhead in a direction away from the compartment and is sized to extend into the perforated tube 40 when the cylinders are in the fully extended position as shown in FIG. 1. Located in the flange 58 of perforated tube 40 is a metering or orifice plate 88 which in conjunction with the outer diameter 90 of the metering pin forms an orifice 92.

Located within the compartment 76 is a piston 94 which is sized to slideably move within the compartment and has O-ring 96 for sealing off the piston. A projection or plunger 98 is integrally attached to the piston. The projection is hollow at 100 for a distance in from the open end which is radially enlarged at 102. This enlargement is sized to slideably move within the inside surface 104 of hollow pin 78 and to seal off openings 106 through the wall of the metering pin when the piston is located in the fully retracted position as shown in FIG. 1. The projection or plunger also has a series of openings 108 through the wall to provide communication between the inside of the metering pin and the compartment.

The joined cylinders provide pneumatic hydraulic containers with pneumatic hydraulic chamber A, adjoining hydraulic chamber B, hydraulic chamber C as the part of compartment 76 located on the plunger side of piston 94 and pneumatic chamber D as part of compartment 76 located on the other side of the piston. Hydraulic fluid fills chambers B and C and fills chamber A up to level 110 with the shock absorbing landing gear strut fully extended and in the touchdown mode. In that mode the balance of chamber A is filled with pneumatic pressure entered through fitting 112 and the pressure closed off to maintain that pressure. The valve and the compressor means are known art and are not shown. This primary pneumatic pressure acting on the hydraulic fluid urges the two cylinders apart and fully extends the strut. In this mode chamber D is devoid of any pressure and the hydraulic fluid in compartment C forces the piston 94 to the fully retracted position abutting head 66. When in that retracted position enlarged radial head 102 covers the openings 106 and does not permit fluid flow through those openings. During the touchdown mode all the shock of landing and of rebound from the landing loads are effected by the pneumatic spring effect of the primary pneumatic fluid and the flow of hydraulic fluid through orifice 92 as the cylinders interact.

After touchdown and once the landing gear struts are fully loaded secondary pneumatic pressure high enough to overcome the primary pneumatic pressure is introduced into chamber D. This drives piston 94 up toward the bulkhead, changing the hydraulic fluid level to 110a and uncovers openings 106. In this ground operation mode the pneumatic spring characteristics have been changed and now the hydraulic fluid flows through orifice 92 and at the same time flows through openings 106 to provide two simultaneous paths for the fluid during cylinder interaction and give a much softer ground ride.

Figure 3:
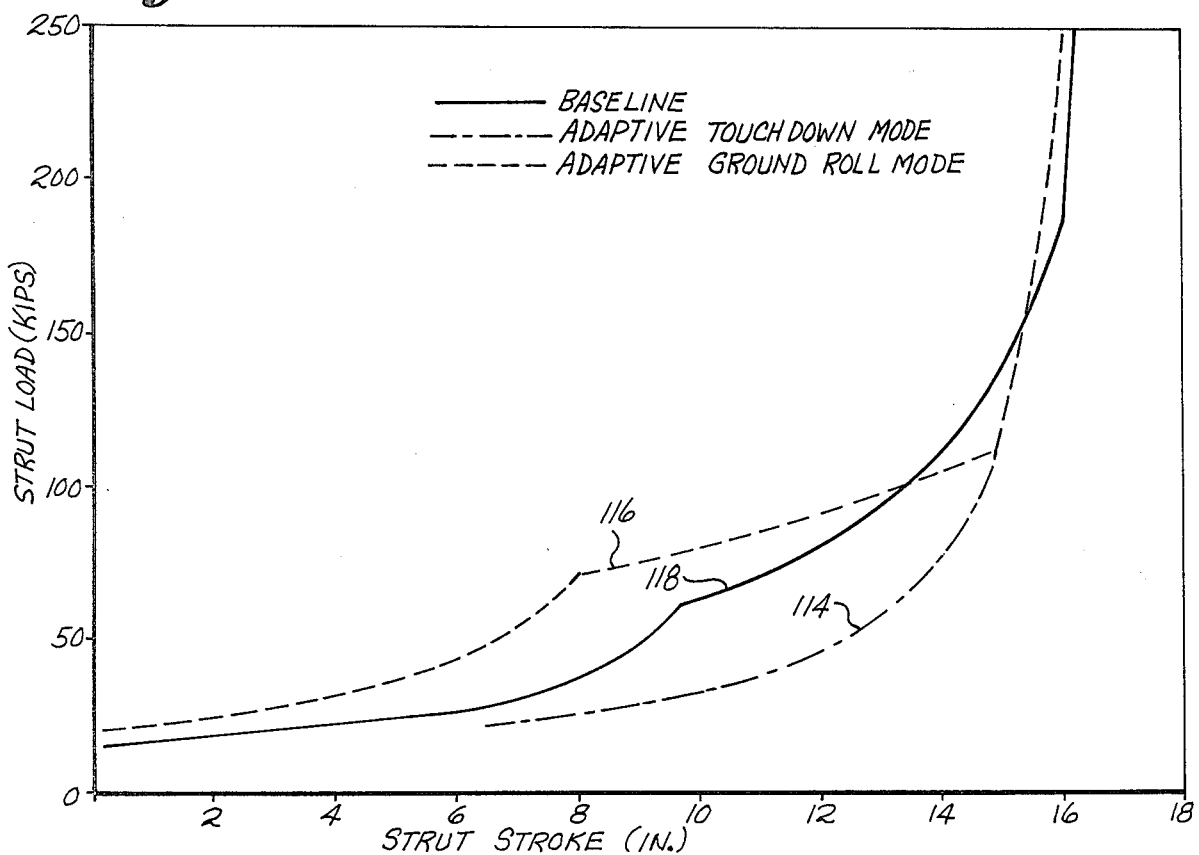
FIG. 3 shows a load stroke diagram of the modes of this invention.

FIG. 3 graphically shows the aircurve of this invention in the touchdown mode curve 114, the ground mode curve 116, and the baseline or previously used mode curve 118. That previously used mode was a conventional pneumatic hydraulic strut with a dual stage pneumatic spring.

FIG. 4 shows a block diagram for automatically changing between the two landing gear modes. In that Figure three way valve 120 is normally open to atmosphere. In that normally open position the valve communicates through line 122 with chamber D, and thus opens that chamber to atmosphere through orifice 124 in outlet line 126 and the strut is in the touchdown mode. When the airplane touches down and after the weight has been transfered to each landing gear a squat switch 128, 130 and 132 is activated by the load and emits a signal. Once all the landing gear are down and the squat switches emitting a signal a "and" logic unit 134 transmits the signal. This "and" unit will not transmit a signal until all the gears are down and loaded. The "and" signal is sent through a time delay unit 136 which preferably has between a 1 and 2 second delay then through an amplifier 138, which amplifies the signal sent to the three way valve to activate solonoid 140 and close that valve. With the valve closed pneumatic fluid from tank 142 flows through line 144, the valve 120, line 122 and into chamber D. The pressure and volume from this tank is high enough to move the piston 94 up toward the bulkhead and provide the ground operation mode in the shock absorbing strut. Line 144 has an orifice 146 to prevent too rapid a change in mode. Tank 142 is sized and kept at a pressure to insure the desired pressure in chamber D. Tank 142 is replenished from supply tank 148. Gas from that supply tank is controlled by solenoid valve 150. A pressure switch 152 is connected to tank 142 and a second pressure switch 154 connected to the line 122. When both these pressure switches send a signal due to low pressure "and" logic 156 signals the solenoid valve to open and thus increase the pressure in tank 142. The supply tank may be filled through servicing port 158 when servicing the vehicle while on the ground. A pilot override bias 160 is provided to serve the amplifier and permit pilot override to prevent switching to the ground roll mode.

I claim:

1. A shock absorbing airplane landing gear strut comprising: a pair of cylinders sealingly and reciprocally mounted one within the other to provide hydraulic pneumatic containment, primary pneumatic means for directly acting on hydraulic fluid to urge the cylinders apart, means for hydraulic dampening of relative movement between the two cylinders during touchdown of an airplane, a compartment within one of the cylinders, a bottomed out piston sealingly and slideably mounted within the compartment with one side of the piston communicating with hydraulic fluid in the cylinders, a logic system initiated by landing having means for introducing secondary pneumatic pressure to the other side of the piston to drive said piston toward the primary pneumatic means, and the piston having valve means for closing off hydraulic fluid flow when in the bottomed out position and for opening to allow hydraulic fluid flow to provide a second and parallel hydraulic fluid dampening means when the piston is used in response to the logic system.

2. A shock absorbing airplane landing gear strut comprising: a pair of cylinders sealingly and reciprocally mounted one within the other to provide pneumatic hydraulic containment, primary pneumatic means for directly acting on hydraulic fluid to urge the cylinders apart, a bulkhead forming a compartment near an end of one of the cylinders, a hollow pin attached to the bulkhead and extending axially in a direction away from the compartment, orifice means around the extension of the pin to provide hydraulic fluid dampening, a piston sealingly and slideably mounted in the compartment, a hollow projection from the piston having a radially enlarged end sized to slideably fit inside the hollow pin and located to seal off openings through the walls of the pin with the piston in the fully retracted position and to uncover these holes and provide communication with holes through the side of the hollow projection with the piston away from the retracted position, and secondary pneumatic means for automatically controlling the position of the piston.

3. A shock absorbing airplane landing gear strut as in claim 2 wherein the secondary pneumatic means for controlling the position of the piston comprises: a pneumatic reservoir, a valve leading from the reservoir to a side of the piston, and means for controlling the valve to open the piston to ambient pressure when the airplane is airborne and to provide pneumatic pressure to the piston from the reservoir after touchdown of the airplane to provide a completely different dampening mode after the airplane is on the ground.

4. A shock absorbing airplane landing gear as in claim 3 wherein the means for controlling the valve comprises: squat switches activated by loading of the gear due to touchdown, "and" logic activated when all gears are loaded, a time delay to the "and" logic signal, and means for amplifying that signal and send it to actuate the valve.

5. A shock absorbing airplane landing gear as in claim 4 further comprising means for controlling the rate of pneumatic fluid flow through the valve.

6. A shock absorbing airplane landing gear strut comprising: an outer cylinder open at one end, an inner cylinder reciprocally and sealingly mounted to telescope within the open end of the outer cylinder and with said inner cylinder open ended toward the outer cylinder to form a pneumatic hydraulic compression chamber, primary pneumatic means for directly acting on hydraulic fluid to urge the cylinders apart, a perforated tube fastened to and extending from the closed end of the outer cylinder with the other tube end sealingly and slideably joined to the inside of the inner cylinder, a plate to extend radially inward from the sealed end of the perforated tube and sized to provide an orifice around a pin axially located with respect to and movable with the inner cylinder to provide a first mode for hydraulic dampening of touchdown of an airplane, a bulkhead forming a separate compartment near the closed end of the inner cylinder with the axially located pin joined to the bulkhead and the pin hollow throughout its length and having an opening through the wall of the pin near the bulkhead, a piston sealingly and reciprocally mounted in the compartment, an axial projection integral to the piston to extend through the bulkhead with a boss on the end to slideably move within the pin and located to close off the opening through the pin with the piston in the fully retracted position and with the projection hollow for a distance from the end and having openings through the wall of the projection to communicate with the openings through the wall of the pin and provide a second path for hydraulic dampening of the strut with the piston away from the retracted position during the ground operation mode, and means for automatically converting between the two modes.

7. A shock absorbing airplane landing gear as in claim 6 wherein the means for automatically converting between the two modes comprises: a pneumatic control valve making connection to the compartment behind the piston with the valve normally open to atmosphere to permit the primary pneumatic means to fully bottom out the piston and close off the opening through the pin, a logic means initiated by load on the gear after airplane touchdown to actuate the pneumatic control valve to introduce pneumatic fluid into the compartment and drive the piston toward the bulkhead to uncover the opening in the pin and provide an additional path for hydraulic dampening.

8. A shock absorbing airplane landing gear strut as in claim 7 wherein the logic means comprises: squat switch signals initiated by load on the gear after landing, "and" logic signals transmitted when all gear are loaded, a time delay circuit and an amplifier to transmit the signal to the pneumatic control valve.

9. A shock absorbing airplane landing gear strut as in claim 8 further comprising flow control means for regulating the rate of flow of pneumatic fluid in controlling the piston position.

* * * * *